United States Patent [19]

Hall, Jr. et al.

[11] Patent Number: 5,304,342

[45] Date of Patent: Apr. 19, 1994

[54] CARBIDE/METAL COMPOSITE MATERIAL AND A PROCESS THEREFOR

[76] Inventors: H. Tracy Hall, Jr., 634 N. 550 East, Orem, Utah 84057; David R. Hall, 738 E. 2680 North, Provo, Utah 84604

[21] Appl. No.: 897,311

[22] Filed: Jun. 11, 1992

[51] Int. Cl.$^5$ .......................... B22F 3/14; B22F 7/06
[52] U.S. Cl. ...................................... 419/11; 51/293; 419/18; 419/31; 419/38; 419/45; 419/47; 419/51; 428/568; 428/569
[58] Field of Search ............................. 29/182.7, 182.8; 51/293, 307; 75/0.5 BA, 203, 206, 237, 240, 243, 244; 148/11.5 P; 175/107, 329, 410; 251/368; 384/303; 419/11; 428/545, 547, 551, 552; 501/87

[56] References Cited

U.S. PATENT DOCUMENTS

| | | | |
|---|---|---|---|
| 3,647,401 | 3/1972 | Meadows | 29/182.8 |
| 4,234,333 | 11/1980 | Ghandehari et al. | 75/0.5 |
| 4,330,332 | 5/1982 | Schachner et al. | 75/203 |
| 4,374,900 | 2/1983 | Hara et al. | 428/551 |
| 4,694,918 | 9/1987 | Hall | 175/329 |
| 4,695,321 | 9/1987 | Akashi et al. | 75/243 |
| 4,851,041 | 7/1989 | Polizzotti et al. | 75/240 |

Primary Examiner—Donald P. Walsh
Assistant Examiner—J. N. Greaves

[57] ABSTRACT

A sintered product useful for abrasion- and impact-resistant tools and the like is provided comprising an iron-group metal binder and refractory metal carbide particles, e.g. tungsten carbide, formed in situ during sintering by the exothermic reaction of a carbide-forming refractory metal powder with a carbon source mixed therewith. The sintering is carried out at an elevated temperature and at a pressure at which diamond is stable in the presence of a liquid phase comprised substantially of an iron-group binder metal, refractory metal, and dissolved carbon. The product may optionally contain diamond, up to about 95% in volume, enabling its properties to be tailored for a wide range of applications.

26 Claims, 3 Drawing Sheets

CARBIDE/METAL COMPOSITE MATERIAL AND A PROCESS THEREFOR

BACKGROUND OF THE INVENTION

This invention relates to a reaction sintered carbide/metal product, optionally incorporating diamond, characterized by improved sinterability and strength and by the ability to optimize its physical properties for a wide variety of applications.

Reaction sintering as employed herein refers to a consolidation process in which one or more constituent substances undergo a chemical reaction to form one or more reaction products, said reaction enhancing the sintering process and said reaction product or products becoming a useful constituent of the sintered body.

Embodiments of this invention incorporating residual diamond may be characterized as sintered carbide/diamond products. The invention therefore relates to the field of sintered diamond products useful for cutting tools and the like. By sintered diamond is meant a sintered body incorporating diamond, usually with one or more additional constituents functioning as binders or sintering aids.

Sintered diamond products are useful in the production of sintered composite products comprising an active layer containing said sintered diamond product bonded to and supported by a stronger material, such as cobalt-cemented tungsten carbide. One embodiment of the invention, characterized by zero diamond content or by low diamond content, is useful as a bonding layer between said substrate and said active layer. An embodiment of the invention characterized by intermediate diamond content is useful as a transition layer between said substrate and said active layer, or between said bonding layer and said active layer. An embodiment of the invention characterized by high diamond content is useful as said active layer per se. Those embodiments of the invention which incorporate diamond should not be confused with the product known in the art as polycrystalline diamond or PCD. PCD is employed herein to refer to a sintered diamond product wherein diamond is the major constituent and substantially all of the diamond crystals are directly bonded to adjacent diamond crystals.

THE PRIOR ART

Many patents have issued relating to sintered diamond and PCD products. As illustrative examples of such patents, the following are referred to: U.S. Pat. No. 3,745,623 (Re 32,380)

This patent, (hereinafter the Wentorf et al patent) discloses a composite compact comprising polycrystalline diamond consisting primarily of a relatively thin layer of diamond crystals in excess of 70% by volume, substantially all of the diamond crystals being bonded directly to each other in the presence of a cobalt catalyst-binder, this diamond layer in turn being bonded directly by sintering to a supporting substrate of cobalt-cemented tungsten carbide.

Although this patent teaches use of either a pre-sintered WC/Co body or a body of WC/Co molding powder in contact with the diamond layer, in practice only a pre-sintered WC/Co is used. A fully dense body obviously will save precious space in the expensive high pressure environment. Additionally, use of a rigid substrate body reduces finishing costs by enabling a composite compact to be sintered to near-net shape. It would appear, however, to be desirable to employ at least a thin layer of WC/Co molding powder as an interface between the pre-sintered WC/Co body and the diamond layer as a bonding layer, so as to enhance adhesion between the PCD and WC/Co substrate, but it has not proven possible in practice to obtain adequate sintering of WC/Co molding powders in contact with diamond.

Compacts comprising diamond crystals in contact with a catalyst-binder material are necessarily produced at extremely high pressures, generally in excess of 4.5 GPa (45 kilobars), because at atmospheric pressure the diamond would revert to graphite at the high temperatures (usually in excess of 1200° C.) required to melt the catalytic binder metal. Because the coefficient of thermal expansion of the WC-Co base material is significantly higher than that of the sintered polycrystalline diamond (PCD) material, substantial stresses arise at the PCD/WC-Co interface when the product is cooled down from the sintering temperature. These built-in stresses reduce the strength of the compact and can lead to premature failure or delamination of the sintered diamond layer or table from its supporting substrate. The Wentorf et al patent, beginning with line 42 of column 4, teaches the desirability of accommodating these interfacial stresses by providing a transition layer or zone between the PCD and the WC-Co base, containing both carbide-cobalt powder and diamond grit in a gradated mix to minimize stress concentrations. In practice, however, it also is difficult to obtain adequate sintering of such diamond/carbide/cobalt mixtures. Although diamond particles can be effectively sintered at high pressures by WC-saturated cobalt, it has not proven possible to adequately sinter WC/Co with carbon-saturated cobalt. We believe that this is due to the fact that saturation of cobalt with carbon (as from a mixed or contiguous diamond source) suppresses dissolution of WC (and hence sintering of WC) to a substantial extent, whereas saturation of cobalt with WC does not appear to significantly suppress additional dissolution of carbon from diamond (and hence sintering of diamond).

Although the combination of a PCD layer with a strong WC-Co supporting base has created a number of new application for PCD, these applications are generally limited to conditions of low impact. Development of a carbide/metal composition capable of being sintered in the presence of diamond would lead to a stronger bonding material between the active layer and the substrate. Development of a sinterable carbide/metal/diamond composition would lead to a highly effective transition layer as well as to an impact-resistant diamond-containing active layer, thereby opening many new applications. U.S. Pat. No. 4,231,762

One approach to providing a diamond/carbide/cobalt composite having properties intermediate those of PCD and WC-Co is disclosed in U.S. Pat. No. 4,231,762. Fine-grained compacts are provided by milling fine diamond powders for extended periods in metal carbide mills with metal carbide milling media. Very fine particles of the metal carbide and its binder are eroded from the mill and milling media. The fine carbide particles are said to interfere with grain growth of the diamond during high-pressure sintering, thereby providing for a fine-grained compact.

The material produced is not suggested for use as a transition layer material or for use in high impact situations. Although the material is said to provide equivalent abrasion resistance to prior-art PCD in uninterrupted cutting of aluminum-silicon alloys or in wire-drawing dies, it is also said to be more easily ground than prior-art PCD. It is thought that finer-grained PCD generally gives greater abrasion resistance, but usually at the expense of impact resistance. Grinding is a high impact operation, and ease of grinding is indicative of low impact strength.

U.S. Pat. No. 4,311,490

This patent teaches an improvement to the process of U.S. Pat. No. 3,745,623 whereby the diamond layer to be sintered (by infiltration of the liquid phase derived from the support WC/Co) is disposed in layers, the coarsest layer of diamond crystals being closest to the source of catalyst metal and being comprised of crystals having a largest dimension of between about 75 and about 500 micrometers, and the finest layer being disposed farthest away from the catalyst metal and being comprised of crystals having a largest dimension of less than 10 micrometers. The coarse layer is said to provide for freer infiltration of the liquid catalyst/binder to the fine layer, as compared to a single, thick diamond layer comprised solely of fine particles. Additionally, the coarse layer is said to provide a better bond to the substrate and provide a polycrystalline mass of improved integrity and uniformity. Moreover, the thickness of the PCD mass is said to be increased relative to that otherwise available.

Our experience has shown that PCD compacts comprising fine diamond particles generally exhibit increased abrasion resistance relative to coarse materials, whereas coarse PCD compacts generally exhibit improved toughness and resistance to chipping and spalling relative to fine-grained PCD compacts. It can thus be seen that U.S. Pat. No. 4,311,490 teaches, to a certain extent, a means of providing a transition in properties between the base carbide and the outermost, working layer.

U.S. Pat. No. 4,274,900

This patent discloses a diamond wire drawing die in which a diamond sintered body is surrounded by a cermet consisting of a hard compound of (Mo, W)C type carbide crystals containing molybdenum as a predominant component bonded by an iron group metal, in which the binder phase of the diamond sintered body contains an iron group metal and fine carbide crystals containing molybdenum as a predominant component.

According to the patent, the metal binder of the (Mo, W)C cermet melts and impregnates the diamond powder. Molybdenum carbide dissolved in this eutectiferous liquid phase then precipitates out during cooling to the solid state to form fine carbide crystals dispersed in the binder phase.

As with U.S. Pat. No. 4,231,762, the carbide constituent of this patent serves primarily to inhibit diamond grain growth. The patent teaches means for enriching the Mo content of the (Mo,W)C in the diamond layer, since oxidation products of Mo are said to having lubrication qualities of benefit to wire drawing dies. The primary means taught for Mo enrichment is that of deriving the carbide of the diamond body by infiltration from the (Mo,W)C support body, since the melt becomes enriched in Mo relative to the solid. For applications where it may be desirable to have larger quantities of carbide present in the diamond body than are available from the eutectic solution, the patent teaches addition of one or more of molybdenum powder, Mo2C powder and WC powder in a suitable amount capable of forming carbides of (Mo,W)C or carbides containing molybdenum as a predominant component.

The material of this patent is restricted to wire drawing applications, where because of the support of the surrounding carbide body, the strength of the diamond body as a whole is of less concern than the hardness and lubricity of the binder phase within the diamond body.

U.S. Pat. No. B1 4,525,178

Another approach to providing a diamond/carbide composite with certain properties intermediate those of PCD and cemented WC-Co is disclosed in this patent. To produce a composite polycrystalline diamond body, a first composite material comprising discrete particles of sintered tungsten carbide-cobalt is prepared by heating tungsten carbide and cobalt together in a vacuum furnace. Particles of the pre-cemented carbide are then combined with diamond crystals and the mixture is sintered at high temperature and at a pressure at which diamond is stable, to create, depending on the relative ratios of diamond and precemented carbide, either a polycrystalline diamond matrix having discrete pieces of pre-cemented carbide distributed throughout, or a pre-cemented carbide matrix having polycrystalline diamond masses intermixed throughout. This material was found to have utility in the production of composite compacts when used as a transition layer serving to reduce built-in stresses between an active layer of prior-art PCD and the WC-Co base or substrate. A disadvantage of the patented material is that in applications involving high impact, fatigue cracks tend to form which propagate along the interfaces between the WC-Co masses and the polycrystalline diamond masses. These adversely affect the adherence of the active layer of PCD and cause the composite to fail.

Another problem is that it is difficult to obtain WC-Co presintered materials by prior-art processes having individual presintered carbide particle sizes much smaller than one micrometer. Thus, the pre-sintered WC-Co granules are usually several micrometers in size. The material is non-homogeneous on a scale smaller than a few micrometers and is therefore not suitable for applications where finer sizes might be desirable. Moreover, the patented material may not be suitable for use as an active layer, due to the tendency for the discrete particles of pre-cemented WC-Co carbide to rapidly erode when subjected to wear, thus forming pits which serve as points of weakness and stress-risers in the surrounding PCD material of the active layer.

U.S. Pat. No. 4,811,801

This patent is directed to a rock bit insert which has a polycrystalline diamond surface on an insert body which preferably is made of a cemented WC-Co composition selected for the physical properties of modulus of elasticity, coefficient of thermal expansion, magnetic coercivity, and hardness according to the intended application.

Transition layers comprising polycrystalline diamond with pieces of pre-cemented carbide dispersed therein, as in U.S. Pat. No. 4,525,178, may be disposed between the top sintered PCD layer and the cemented carbide substrate. The transition layer adjacent to the cemented carbide substrate has a lower concentration of PCD than the layer above it, thus providing a gradation of decreasing diamond content ranging from a maximum in the top PCD layer to a minimum in the PCD-containing transition layer bonded to the substrate or support.

For a given application, it is desirable to provide the stiffest possible WC-Co cemented carbide substrate, that is, one with a high modulus of elasticity, thereby minimizing the deflection of the PCD layers and reducing the likelihood of PCD failure. However, if the modulus of elasticity is too high, the inserts are prone to break off during drilling. The physical properties specified as preferred for air-assisted percussion bit and roller bit inserts imply a range of about 4 to about 9 weight percent cobalt. Illustrative of a most preferred composition for this application is one containing about 6 wt% Co, having a hardness of 90.8 Ra (Rockwell-A scale). A relatively high modulus of elasticity, about $96 \times 10^6$ psi is implied. The properties specified as preferred for mud-assisted roller bit inserts imply a cobalt concentration ranging from about 9 to about 13 weight percent. Illustrative of a most preferred composition is one containing about 11 wt% Co, having a hardness of 88.8 Ra. A somewhat lower modulus, about $85 \times 10^6$ psi is implied.

OBJECTS OF THE INVENTION

It is a general object of the invention to provide a reaction sintered carbide/metal product, optionally incorporating diamond, characterized by improved sinterability and strength and by the ability to optimize physical properties for a wide variety of applications, such as for optimum wear resistance and improved resistance to impact.

Another object of the invention is to provide for an improved reaction sintered carbide/metal product having no diamond content or low diamond content to serve as a bonding layer between the supporting substrate and a transition layer or between the supporting substrate and an active layer of a composite compact.

A further object of the invention is to provide an improved reaction sintered carbide/metal/diamond product having intermediate diamond content to serve as one or more transition layers between a supporting substrate and an active diamond-containing layer or between said bonding layer and said active layer.

Another object of the of the invention is to provide an improved reaction sintered carbide/metal/diamond product having high diamond content to serve as the active layer per se. An additional object is to provide a sintered composite structure having a multiplicity of layers bonded to a cemented refractory metal carbide substrate, each succeeding layer comprising an embodiment of the invention incorporating a higher diamond content than a preceding layer.

Still another object of the invention is to provide a diamond/carbide multi-layered composite body comprised of a top layer of a prior-art composition comprising sintered diamond, polycrystalline diamond (PCD), or the like, bonded through at least one transition layer or bonding layer to a cemented refractory metal carbide substrate.

These and other objects will more clearly appear from the following disclosure and the appended drawings.

THE DRAWINGS

The views shown in FIGS. 1-4 are shown enlarged for purpose of clarity.

SUMMARY OF THE INVENTION

The present invention is directed to a method for producing a broad range of sintered refractory metal carbide/binder metal/diamond compositions characterized by improved sinterability and strength. The carbides are produced in-situ during a high pressure reaction sintering process. The carbide grains are formed exothermically by the reaction of a carbon source, which may comprise diamond or non-diamond carbon, with a carbide-forming refractory metal.

The carbide-forming metal particles which provide the source for carbide crystal growth comprise V, Nb, Ta, Cr, Mo, W, or alloys thereof. W or W-Mo alloys are preferred. The carbon source for the carbide crystals comprises any form of chemically pure carbon; diamond is preferred. The catalytic binder metal is an iron group metal; cobalt being preferred.

Broadly stated, the method comprises providing a compact formed of a substantially uniform mixture of particles of a carbide-forming refractory metal with a carbon source which may comprise diamond or non-diamond carbon, and a source of an irongroup catalytic binder metal, which may comprise particles of binder metal mixed with the refractory metal and carbon source, or which may comprise a mass containing a binder metal placed adjacent to the compact of refractory metal and carbon source, such as a pre-cemented support body of WC/Co, such that during liquid phase sintering, the liquid phase containing cobalt infiltrates the compact. The atomic ratio of carbon to refractory metal depends on the intended application and may be less than one, equal to one, or greater than one.

The compact is then subjected to reaction sintering at an elevated temperature at which a liquid phase forms comprised of a portion of each of said binder metal and said refractory metal and carbon, and at a pressure at which diamond is stable. If the carbon source is non-diamond, the excess unreacted carbon is transformed to diamond at the high pressure and temperature at which diamond is stable. The sintering is continued to form by reaction refractory metal carbide in situ. Following completion of sintering, the compact is cooled to provide a sintered product containing particles of said in situ produced refractory metal carbide coherently and strongly bonded to the binder metal. Depending on the ratio of carbon to refractory metal which has been selected, the compact may contain varying amounts of residual diamond. The amount of diamond in the compact may range from about 0% to about 95% by volume, with the balance essentially the refractory metal and the catalytic binder metal.

The temperature at the onset of sintering will preferably be at least that of the minimum melting point in the system: refractory metal/carbon/binder metal at the pressure chosen, and the pressure will preferably be one within the diamond-stable region of the diamond/graphite equilibrium diagram.

The invention is also directed to products producible by the method.

Thus, the sintered product may comprise a refractory metal carbide formed in situ during sintering by the reaction of a finely divided carbide-forming refractory metal powder with a carbon source mixed therewith comprised of diamond or non-diamond carbon, and a binder metal, the sintering having been carried out at an elevated temperature in the presence of a liquid phase comprised substantially of the iron-group binder metal containing some dissolved refractory metal and dissolved carbon and at a pressure at which the diamond particles are substantially stable in the presence of said liquid phase. The product may contain diamond particles coherently and strongly bonded within.

The product of the invention is characterized by a substantially uniform distribution of in situ produced particles of refractory metal carbide and an iron group catalytic binder metal, said particles of refractory metal carbide being obtained by sintering of a compacted mixture of particles of a carbide-forming refractory metal and a carbon source which may comprise diamond in the presence of a liquid phase comprising said binder metal, said refractory metal, and carbon, the refractory metal carbide being produced exothermically in situ by the reaction of the refractory metal with said carbon source.

The process of the invention makes it possible to prepare compacts comprising the finest diamond grain size without substantial grain growth. The process is compatible, however, with any size of diamond; thus the diamond size can be selected for the application independent of process considerations.

The process also provides for growth of well-shaped crystals of carbide down to sub-micrometer sizes. Preferably, the refractory metal source particles will be of the finest grain size possible.

The powder to be reaction-sintered is preferably well-mixed. Most preferably, the carbide-precursor grains are provided in high purity and controlled particle size by chemical reduction of chemical compounds of the desired metals, most preferably by reduction with hydrogen. To inhibit sintering together of the metal grains during the reduction process, fine diamond is preferably mixed with the chemical compounds of the metals prior to reduction. Suitable compounds of carbide-forming metals include any hydrogen-reducible compound, most preferably a compound which does not liberate corrosive or toxic products upon reaction with hydrogen. Suitable compounds are oxygen-containing compounds which include oxides, hydroxides, carbonates, carboxylates, and other hydrogen reducible compounds of the metals. As a rule of thumb, compounds containing the lowest volume percent of the desired metal will be most suitable for attrition to fine particle size. The finest particle sizes are produced by milling the lowest density, most friable of such compounds with fine diamond in carbide mills with carbide milling media, or by spray-drying solutions of the precursor metal compounds containing diamond in suspension.

If a low concentration of catalyst/binder metal is desired in the finished product, it is desirable to derive all or most of the catalyst/binder from a body external to the refractory metal/carbon source compact. In this case, a small quantity of binder metal powder may be mixed with the refractory metal powder and carbon source to provide for uniform wetting of the compact as an aid to infiltration. If the sintered product is to contain substantial quantities of diamond and the diamond grain size is quite fine, it is preferred to provide most of the catalyst/binder in mixture with the refractory metal and carbon source. When binder metal is to be provided in the mixture, it is preferred to provide it in the form of a hydrogen-reducible compound of the binder metal, to be milled together with the refractory metal compound and the carbon source and reduced simultaneously therewith. The same guidelines suggested for selecting the refractory metal compound apply to selection of the binder metal compound.

The high pressure reaction-sintering process following the reduction process proceeds at temperatures near the ternary eutectic or lowest melting point (at pressure) of the system carbon/carbide-precursor metal/catalyst-binder. Although reaction-sintering can occur below the melting point of the system, especially when the finest particle sizes are employed, temperatures in excess of the eutectic or lowest melting point are preferred. For a given reaction temperature, pressures within the diamond-stable region of the diamond-graphite phase equilibrium diagram are employed.

The relative proportions of the constituents in the material of the invention can be varied to tailor the properties of the composite to a variety of uses. One application which employs relatively high diamond concentration in the diamond/carbide composite is the provision of an active layer in a compact used for continuous cutting of soft abrasive rocks, non-ferrous metals, glass, ceramics, and other hard or abrasive materials An application which employs a somewhat reduced diamond concentration is that of an active layer of a composite compact used for interrupted cutting of any hard, abrasive materials, especially interrupted rock drilling, such as with air percussion bits, air roller bits, and mud roller bits, where higher impact resistance is desired together with high abrasion resistance. An application calling for carbide concentration equal to or exceeding the diamond concentration is the use of the material of the invention as a transition layer in a composite compact, interposed between a supporting tungsten carbide/cobalt substrate and an active layer comprising either prior-art polycrystalline diamond material or a high-diamond concentration embodiment of the present invention.

It has also been discovered that an embodiment of the invention having no residual diamond content is also highly effective as a bonding layer between a pre-cemented carbide substrate and a low-diamond content transition layer embodiment of the present invention.

DETAILED DESCRIPTION OF THE PREFERRED EMBODIMENTS OF THE INVENTION

Practice of the preferred embodiments of the present invention requires as a starting material an intimate mixture of powders comprising a carbon source including diamond, a carbide precursor metal, and optionally a binder metal. If the carbon source includes non-diamond carbon, the non-diamond carbon should preferably be more finely divided than the diamond and should not exceed in quantity the amount required for complete carburization of the carbide precursor. In the most preferred embodiment, in which the carbide precursor metal and (optional) binder metal are derived by hydrogen reduction of a mixture of compounds of these metals with the carbon source, diamond is preferred as the sole carbon source, because it resists attack by hydrogen better than does non-diamond carbon. The most preferred carbide precursor is tungsten metal. When tungsten metal is used, the diamond is preferably provided in an amount equal to or in excess of the amount required for complete carburization of the tungsten. The most preferred binder metal for use with tungsten is cobalt metal.

In one embodiment of the invention, it is desirable to produce a composite having a very fine grain size. In practice, it is not possible to obtain sub-micrometer mixtures of diamond, carbide precursor metal, and binder metal by simply milling or mixing powders of these materials, because carbide precursor and binder metals are not available in sufficiently small sizes. Even sub-micrometer powders commercially available often actually consist of larger aggregates of sub-micrometer grains, because the reduction of pure metals from their chemical compounds of necessity occurs at temperatures sufficient to enable partial sintering together of the resulting grains. These polycrystalline aggregates are difficult to break up into individual sub-micrometer grains, even with aggressive milling. Milling of metal powders also can result in agglomeration of the powders rather than attrition.

Accordingly, it has proven expedient in the practice of the invention to provide minute, separated grains of carbide precursor and (optional) binder metals by first providing a mixture of fine diamond with finely divided compounds of the carbide precursor metal and (optional) binder metal, and then to chemically reduce the mixture, preferably with hydrogen. The well-disbursed diamond grains isolate the metal grains from each other during the reduction process, thereby preventing grain growth of the metals. The resulting mixture of diamond, carbide precursor, and (optional) binder powders is then processed into a compact or a composite compact at high pressures and temperatures by well-known prior-art high-temperature/high-pressure procedures.

If the powder is sufficiently fine, the distances between particles will be sufficiently small to completely carburize the carbide precursor metal by solid-state diffusion at temperatures below the equilibrium melting point of the system. In practice, however, it has proven expedient to melt the catalyst binder, which serves to hasten transport of carbon, expediting the growth of the metal carbide crystals.

In the preparation of a composite compact, it is desirable to provide a gradation of properties by providing two or more layers of the material of the invention. The outermost, active layer should have a diamond concentration sufficiently high to resist abrasion in the desired application, and the inner layer or layers should have diamond concentration less than that of the active layer, in order to bridge the properties between the active layer and the WC-Co base. By providing such a transition layer or layers containing the in situ formed refractory metal carbide, the stresses arising during cooling from sintering temperature are distributed through a finite thickness of material rather than being concentrated at a single interface. Instead of discrete layers of differing concentrations, it might be desirable to provide a single layer having a continuous gradation in properties, from high diamond concentration on the outside to low concentration on the inside of the part.

PREPARATION OF THE MIXTURE

One method of providing an intimate mix of fine diamond particles with extremely fine particles of chemical compounds of the precursor carbide and (optional) binder is to mill together soft, friable compounds of these metals with extremely fine diamond with carbide media (typically WC-Co balls) in a carbide mill. The mixture can be milled dry, but preferably a low-viscosity carrier fluid, such as acetone, is added to aid in mixing and circulation during milling and to enable clean separation of the mixture from the milling media after milling. If a coarser diamond constituent is desired in the composite, the coarser diamond fraction can be added late in the milling to avoid excessive erosion of the mill and milling media.

In practice, the extent of erosion of the mill when submicrometer-sized diamond is employed has been found to be negligible. If the mill and balls are WC-Co, any eroded material will be likely to be compatible with the desired product. Compounds found to be most suitable for this purpose are those in which the metal comprises the smallest possible weight fraction of the compound, and which preferably do not liberate toxic or corrosive products during hydrogen reduction. The classes of compounds mentioned in the preceding summary of the invention are those most likely to be found suitable. Compounds demonstrated to be suitable for providing finely-divided tungsten and molybdenum metal particles include tungstic oxide: $WO_3$; ammonium tungstates, such as ammonium paratungstate (APT): $(NH_4)_{10}W_{12}O_{41}.5H_2O$; molybdic oxide: $MoO_3$; ammonium molybdates; including mixtures of said compounds. Compounds found most suitable for providing finely-divided cobalt metal include hydrous and anhydrous forms of basic cobalt carbonate: $2CoCO_3.3Co(OH)_2.H_2O$; cobalt carbonate: $CoCO_3$, and cobalt hydroxide: $Co(OH)_2$. (Cobalt oxides have proven to be quite tough and resistant to milling).

A second method of providing a finely-divided mixture of diamond powder and metal compounds is to prepare a suspension of fine diamond in a solution of the metals, such as a solution of ammonium tungstate and cobalt acetate. The suspension is then spray-dried to provide a fine mixture of particles suitable for reduction.

REDUCTION OF THE MIXTURE

After preparation of the diamond/metal compound mixture, the mixture is reduced with hydrogen at a temperature above that necessary to reduce the metal precursor compounds to their respective pure metals but below that at which the diamond would begin to revert to graphite. A suitable temperature range is 500°–1100° C., most preferably 550°–700° C. At temperatures higher than about 600° C., cobalt and tungsten appear to catalyze the etching of diamond by hydrogen to form methane. A controlled etching of diamond may be desirable to impart a desired surface texture to the diamond crystals or to provide for a more blocky-shaped diamond crystal. Providing an excess of hydrogen inhibits carburization of the tungsten. Indeed, for some purposes, it may be desirable to provide the carbide precursor metal by de-carburization of the metal carbide. Although it is most desirable to provide the carbide precursor metal in a state largely free of carbon, there may be some circumstances in which the reduction conditions provide a partially-carburized precursor. The provision of a carbide precursor which contains carbon in a sub-stoichiometric amount is deemed to fall within the scope of the invention.

One method for accomplishing the reduction of the carbide and binder compounds is to place the powders in shallow boats of an inert material such as quartz and to pass hydrogen gently across the powder so as to carry away the product gases without carrying away the powders. The finest possible metal particles are produced by utilizing higher hydrogen flow rates and lower temperatures. For powders containing tungstic oxide and basic cobalt carbonate which are spread approximately 10 mm thick, times in excess of 12 hours and quantities of hydrogen greater than 10 times that dictated by stoichiometry are typically required for complete reduction. The progress of the reduction can be monitored on an interrupted basis by weighing the boats or on a continuous basis by monitoring the water content of the exhaust gas.

A second method for reduction of the powder is to provide a fluidized bed, whereby the reducing gas passes through the powder and suspends it in a turbulent fashion. A fluidized bed can produce larger quantities of powders at higher rates, and efficient stirring of the powder coupled with effective removal of product gases should result in a more homogeneous and finer-grained product.

For the finest possible grain size, the mixture can be partially reduced at the lowest possible temperature, so that the individual grains of chemical compound are converted to sub-granules of metal particles separated by residual oxides. The powder is then milled to break apart these sub-grains and disburse diamond particles among them, after which it is again reduced, this time to completion.

By reducing the metal compounds to metals in an intimate mixture with diamond, the extremely fine metal particles thus liberated are prevented by the diamond particles from contacting each other and consolidating. The reduced powders are very dark grey or black in appearance, depending on the diamond concentration, in contrast to the light brown or light grey color obtained by prior-art milling of diamond with cobalt and tungsten carbide powders. The tungsten metal particles and the cobalt particles thus produced are preferably of a size smaller than the diamond particles, and are most preferably of a size smaller than one micrometer.

Once the powder is reduced, it is important to protect it from oxygen and water vapor. This can be accomplished by handling the powder in an inert atmosphere, or by protecting the powder with a lubricant/binder, such as paraffin or mineral oil. The powder is placed in a protective can of a refractory material such as molybdenum, columbium, zirconium, titanium, tantalum or the like, which defines the near-net shape of the sintered product and which protects it from contamination during highpressure reaction-sintering. A known dual container consisting of an inner layer of zirconium, which acts as a scavenger for contaminants in the powder, and an outer layer of molybdenum, which protects the zirconium from attack by contaminants in the high pressure cell, is especially efficacious.

In the case of a composite compact, the pre-sintered WC-Co support piece is placed within the protective can in contact with the layer or layers of powder to be reaction-sintered. Precompaction of the can/powder or can/powder/substrate assembly is useful for obtaining minimal shrinkage of the compact during reaction-sintering and for obtaining near-net shape. This is typically accomplished by placing the part in a conforming die or surrounding the part with a pressure-transmitting medium such as salt, pressurizing it to pressures of 100 MPa to 600 MPa (15,000 to 90,000 psi), releasing the pressure, and repeating several times. Coating the powder with a lubricant assists in this predensification. If a binder/lubricant is used, it must then be evaporated from the assembly by slow heating in vacuum, after which the part is re-compacted using the same methods as were used for precompaction.

The can/powder or can/powder/substrate assembly is then surrounded by fully-dense, conforming pieces of salt and placed within the typically cylindrical heater assembly of a suitable high-pressure/high-temperature apparatus. Suitable types of equipment for practicing the present invention include the well known "belt" and cubic anvil presses. The pressure/temperature/time conditions necessary for the preparation of prior-art cobalt-bonded PCD are suitable for the present invention. One suitable cycle for a cubic press apparatus and an embodiment of the invention utilizing reduced mixtures of tungsten, diamond, and cobalt is as follows: apply pressure to 5.5 Gpa (55 kbar, typically requiring 30 seconds); apply power until a temperature exceeding the carbon/tungsten/cobalt eutectic is attained (1400° C. is suitable and may typically require two minutes to attain), hold the temperature constant for five minutes, remove power until the part cools to near room temperature (typically three minutes), then release the pressure (typically 30 seconds), for a total cycle time of eleven minutes.

Experience with prior-art PCD compacts indicates that there is usually a trade-off between abrasion resistance and impact resistance. Grain size of the diamond is the principal factor in this trade-off, with finer grain size providing higher abrasion resistance but lower impact resistance. Additionally, it is extremely difficult with prior-art processes to provide compacts having diamond grain size smaller than a few micrometers. Surprisingly, compacts prepared according to the invention having extremely fine grain size (less than one micrometer) and incorporating as little as 75 volume percent diamond exhibit excellent resistance to both abrasion and impact. Without wishing to be bound by theory, the following considerations may assist in explaining the improved properties attained by the process of the invention:

It is well-known that molten cobalt has a high affinity for tungsten carbide. In sintered WC-Co material, a thin film of cobalt completely surrounds each grain of WC, even where adjacent grain surfaces are essentially contiguous. Much of the strength of WC-Co comes from the excellent adhesion between WC and cobalt, with the stronger cobalt phase typically being in tension and the WC grains being in compression, due to the difference in coefficient of thermal expansion when the compact is cooled. When the cobalt binder is dissolved out of a WC-Co compact, the compact disintegrates into WC powder.

In PCD, on the other hand, the cobalt does not appear to wet the diamond very efficiently, because direct diamond-to-diamond bonds are formed in preference to diamond/cobalt/diamond sandwich structures. The cobalt retained in prior-art PCD does not impart much strength to the structure, as evidenced by the fact that PCD compacts from which most of the cobalt is leached retain most of their mechanical strength. Since the individual diamond grains are not completely surrounded with cobalt, there is no advantageous compression of the brittle diamond phase upon cooling of the compact. Thus, if the compact is heated without confining support, as when brazing a PCD compact to a tool shank, the thermal expansion of confined cobalt masses expanding against the continuous diamond matrix can cause catastrophic cracking of the compact.

The extremely small carbide crystals that grow in-situ in the present invention occupy spaces between the diamond grains that would otherwise be occupied by cobalt, thereby enabling a compact with lower cobalt content and hence higher thermal stability.

The improvement in impact resistance of the present invention relative to prior-art PCD might be attributable to the relative bond strengths of its constituents. Possibly the strength of the tungsten carbide-cobalt and diamond-tungsten carbide bonds in the present invention exceeds that of the diamond-diamond and diamond-cobalt bonds in PCD. This property appears to be improved by providing the largest possible surface area of tungsten carbide, preferably accomplished by providing the tungsten metal compound in a particle size comparable to or smaller than the diamond particles and by mixing it intimately with the diamond powder prior to hydrogen reduction.

The improved abrasion resistance of the present invention, even in embodiments providing as little as 75 volume percent diamond, may be attributable not only to the observed effect of fine particle size but also to the additional hardness imparted to the binder phase by the presence of in-situ grown tungsten carbide.

As mentioned in the discussion of prior art, one possible explanation for the failure to provide high-quality carbide/diamond composites by the sintering of mixtures of diamond with pre-carburized WC and cobalt might be that saturation of the cobalt binder with carbon from the diamond suppresses dissolution of tungsten from the tungsten carbide crystals, thereby inhibiting recrystallization and intergranular bonding of the tungsten carbide crystals to each other or to the surrounding diamond crystals.

By provision of a uniform dispersion of tungsten metal throughout the composite, the tungsten particles are completely recrystallized as they become carburized. (In most embodiments of the invention, there will be insufficient fluid present to completely dissolve the tungsten metal. It is possible that surface forces drive, to a small extent, the dissolution of smaller particles of tungsten metal and their subsequent deposition as tungsten carbide upon larger tungsten carbide bodies, but the majority of the tungsten is probably carburized in the solid state with possible catalytic assistance from cobalt.) It is thought that the large flux of carbon from diamond toward tungsten through the cobalt catalyst-binder sets up large local concentration gradients of carbon which may be beneficial to the sintering process. Despite the large driving force for crystallization, the interposition of diamond and tungsten crystals prevents either constituent from increasing significantly in grain size, but the crystals thus re-grown are thought to be of intrinsically high quality.

Consideration of the volumetric relations between the product and reactant species involved in the reaction sintering process may shed additional light on the favorable results obtained with the present invention. The formula weight, density (grams/cubic centimeter) and molar volume (cubic centimeters/mole) of the constituents are as follows: tungsten metal: 183.85, 19.35, 9.501; diamond: 12.011, 3.513, 3.419; tungsten metal and diamond in 1/1 molar mixture: 195.861, 15.16, 12.92; and tungsten Carbide: 195.861, 15.63, and 12.531. Thus we see that for a compact starting With equal atomic ratios of tungsten and diamond, the over-all reaction:

$$W + C \text{ (diamond)} \rightarrow WC$$

yields a 3.0% decrease in total volume of the compact. When viewed from the perspective of the tungsten particle alone, however, there is a large, 31.9% increase in volume as it becomes carburized to tungsten carbide at the expense of surrounding diamond crystals. This transfer of carbon from diamond to tungsten to form tungsten carbide must add considerable chemical potential to that already provided by surface energy, thereby providing a strong driving force for densification and sintering. The substantial etching of diamond which must occur will probably proceed most rapidly from those diamond surfaces having the highest surface energy, thereby imparting an improved shape to the diamond crystals prior to their final consolidation.

Microscopic examination of the resulting compact reveals that most of the tungsten carbide crystals appear to have grown along a hexagonal axis to produce well-defined crystals with an elongated habit. The excellent crystallinity of the in-situ produced WC particles is a probable indication of high strength. The small rod-shaped WC crystals may also provide a certain degree of fiber-like reinforcement to the compact and possibly a degree of dispersion hardening to the binder phase.

As illustrative of the various embodiments of the invention, the following examples are given:

EXAMPLE 1

Three different mixtures of basic cobalt carbonate, tungstic oxide ($WO_3$), and diamond particles ranging up to about 0.5 micrometers in size were separately vibration-milled for one hour in mills made of tungsten carbide using tungsten carbide balls in acetone. The weight percentages of basic cobalt carbonate, $WO_3$, and diamond for each of the mixtures were as follows: (1) 24/24/52; (2) 14/64/22, and (3) 10/79/11. These desired starting percentages were calculated from previously measured reduction yields of the separate starting materials by working backwards from the final desired concentrations in the reaction sintered product, taking into account the loss of diamond to form WC in situ.

After completion of the milling step, the powders were separated from the milling balls by rinsing the mill with acetone. They were centrifuged, dried, placed in three stainless steel boats to a thickness of about 1 cm and reduced with hydrogen at 700° C. for 67 hours. The total hydrogen consumption was 550 liters, of which about 4% of the total was consumed in the reduction of the oxide compounds.

A small amount of the diamond was consumed during the reduction, presumably due to catalytic methylation, that is, the reaction:

$$2H_2 + C \text{ (diamond)} \rightarrow CH_4$$

The amount of diamond loss was determined by weighing. The final volume percentages were as follows (cobalt metal/tungsten metal/diamond): (1) 8.4/6.2/85.4; (2) 8.3/27.1/64.6; and (3) 8.2/46.2/45.6.

The powders were coated with mineral oil lubricant by quickly covering them in beakers with a solution of mineral oil in petroleum naphtha, followed by evaporation of the naphtha. (A preferred method might be to perform this operation directly in the boats in the reduction furnace, using a stream of nitrogen to evaporate the naphtha, so that the reduced powders are never exposed to air until coated with oil. The reduced powders oxidize readily in air, and even undergo very slow oxidation when protected with oil, unless they are stored under an inert gas or nitrogen.) The powders were utilized to prepare dome-shaped composite compact inserts.

Figure 1:
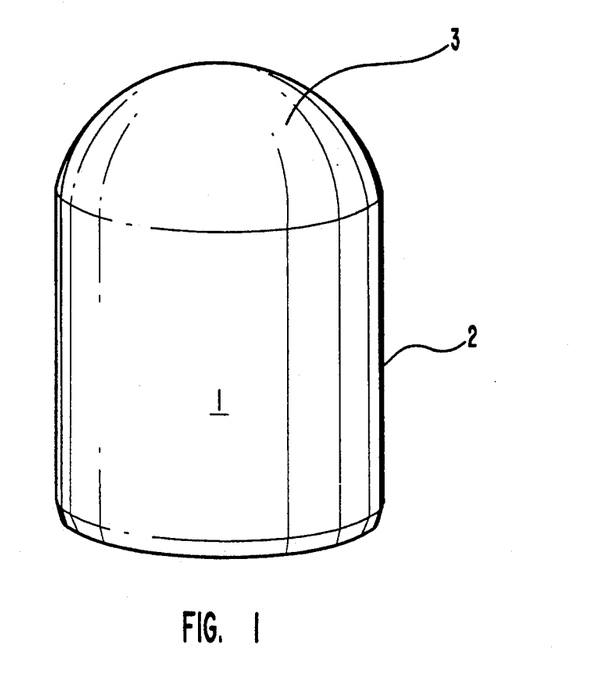
FIG. 1 shows a dome-shaped tool insert upon which a multilayered sintered refractory metal carbide/catalytic binder metal/diamond composition is produced by sintering.
Figure 2:
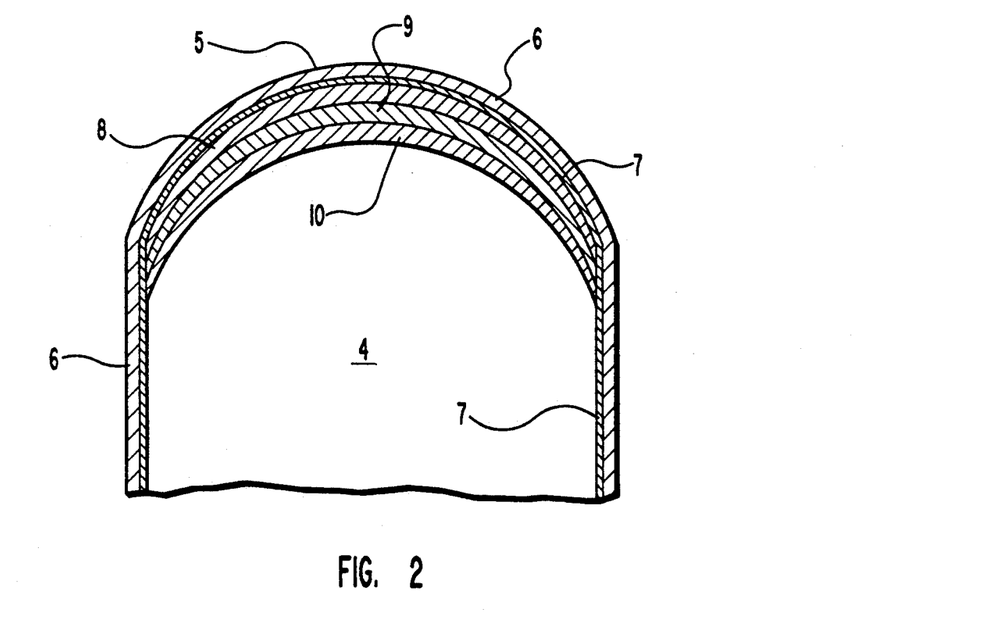
FIG. 2 illustrates in cross section a charge assembly comprising a refractory metal lined container showing prearranged layers of the material to be sintered and against which a dome-shaped tool (as in FIG. 1) is inserted to complete the final composite structure to be sintered and bonded together to form a composite tool.

A typical dome-shaped insert 1 is depicted in FIG. 1. It comprises a body portion 2 and a dome-shaped end portion 3. The container 4 is shown in FIG. 2 having a conforming dome-shaped bottom 5 onto which each of the layers is coated. The container comprises outer shell 6 of molybdenum, about 0.007 inch (0.18 mm) thick, and an inner liner 7 of zirconium, about 0.003 inch (0.076 mm) thick.

One layer of each mixture was applied to the spherical bottom of the container with the diamond-rich layer 8 of composition (1) applied first, followed by intermediate layer 9 of composition (2), and then the final layer 10 of composition (3), the final layer of lower diamond content being the transition layer directly applied to the supporting substrate, that is to say, to the dome end 3 of the tool.

The amount of powder in each of the layers was predetermined to provide a final sintered product with an average thickness per layer of about 0.01 inch (about 0.25 mm). (In this example each layer had a volume of approximately 0.10 cm$^3$. The calculated densities of each layer after reaction sintering were (1) 4.95, (2) 8.34, and (3) 11.47; the weight percent of oil in each mixture was (1) 10.5, (2) 6.6, and (3) 4.9; and the amount of oiled mixture weighed for each layer, in grams, was (1) 0.55, (2) 0.91, and (3) 1.25.)

The pre-sintered WC-Co tool or insert comprised 6 wt% cobalt binder and the balance WC. The tool had a diameter of about 0.76 inch (about 19.3 mm) and a spherical tip radius of about 0.35 inch (about 8.9 mm).

The dome-shaped tool was inserted into the container and the three-layered assembly was pre-compacted against the tool three times at a pressure of about 200 MPa (30,000 psi) in a conforming die. The assembled parts were then forced through the die to swage the container against the cylindrical surface of the WC-Co base, following which a molybdenum cup was placed over the base of the insert which overlapped the exposed edges of the Mo/Zr container. The oil of the compacted layers was evaporated by slow heating in vacuum to 650° C., after which the parts were again compacted three times to the same pressure in the same die.

The assembly was then surrounded by fully-dense, conforming pieces of salt and placed within the cylindrical heater assembly of a cubic press. The pressure was increased to about 5.5 GPa (55 kbar). Power was then applied for two minutes until a temperature of about 1450° C. was attained. (This temperature exceeds the W/C/Co eutectic at this pressure, and these conditions are within the diamond stable region of the diamond/graphite equilibrium diagram.) The temperature was maintained for an additional five minutes, after which the composite body was cooled to near room temperature and removed from the press. The container was removed by grit-blasting using silicon carbide grit.

Accounting for the diamond consumed by reaction with tungsten to form tungsten carbide and assuming no migration of cobalt into or out of any layer, the final volume concentrations of the reaction-sintered layers (i.e., cobalt metal, tungsten carbide formed in situ, and diamond) were calculated to be: (1) 8.4/8.2/83.4, (2) 8.4/36.1/55.5, and (3) 8.3/62.0/29.7, respectively. By comparing the respective volume percentages of the constituents before and after reaction sintering, we see that the in situ reactions in layer (1) resulted in a 2.0% volume gain (with respect to the entire volume) in the tungsten component (accompanied by a nearly identical decrease in the diamond component). The corresponding volume changes for layers (2) and (3) were 9.0% and 15.8%, respectively. It can thus be seen that substantial internal volume changes due to in-situ formation of WC can result from the process of the invention.

Microscopic examination of a polished transverse axial cross section of the sintered composite showed all three layers to be well-sintered and integrally bonded to each other. Interestingly, the layer closest to the WC-Co support was found to be completely depleted of diamond particles in a thin layer, approximately 0.001–002" (0.025–0.05 mm) thick, immediately adjacent to the WC-Co support. Without wishing to be bound by theory, it is believed that this depletion of diamond was caused by migration of a Co/WC liquid of eutectic composition out of the WC-Co base into transition layer 10, indicating that the liquid was not saturated with respect to carbon until it had dissolved away some of the diamond in layer 10. This diamond-depleted layer was seen to be an extremely fine-grained WC/Co material with the WC particles exhibiting a rod-shaped habit.

The reaction sintering process is thereby seen to have transformed transition layer 10 into two transition layers, one having a composition by volume of approximately 8% Co, 62% WC, and 30% diamond and a thickness of approximately 0.008–0.009" (0.20–0.23 mm), and another, thinner, bonding layer having a composition of approximately 10% Co and 90% WC approximately the same as that of the base carbide. This bonding layer is apparently formed in situ by two processes: reaction of diamond with W to form WC, and dissolution of residual diamond by migration of liquid from the base carbide. The bonding layer has a WC/Co composition by volume similar to that of the base carbide, but is clearly distinguishable from the base carbide by the size and habit of the WC particles. It is thought that this diamond-depleted layer has excellent properties as a bonding layer between the base carbide and the diamond-containing layers of the invention.

Aggressive grit blasting of the outermost diamond-rich layer resulted in no discernable erosion. Such abrasion resistance would not be expected for a prior art sintered diamond body containing only 83 volume percent diamond. Although this surprising result might be partially attributable to the extremely fine grain size of the diamond used in this example, which ranged from 0 to 0.5 micrometers, it is likely that other factors are contributing. (The observed relation between grain size and abrasion resistance in prior art PCD-type materials has been discussed previously.)

Figure 5:
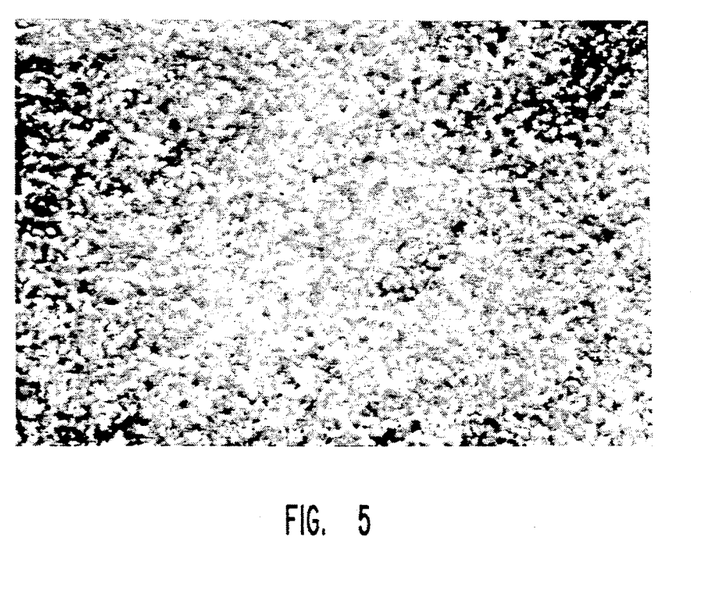
FIG. 5 is a photomicrograph of the product of the invention taken by a scanning electron microscope (SEM) in secondary electron mode taken at 1,700 times magnification.
Figure 6:
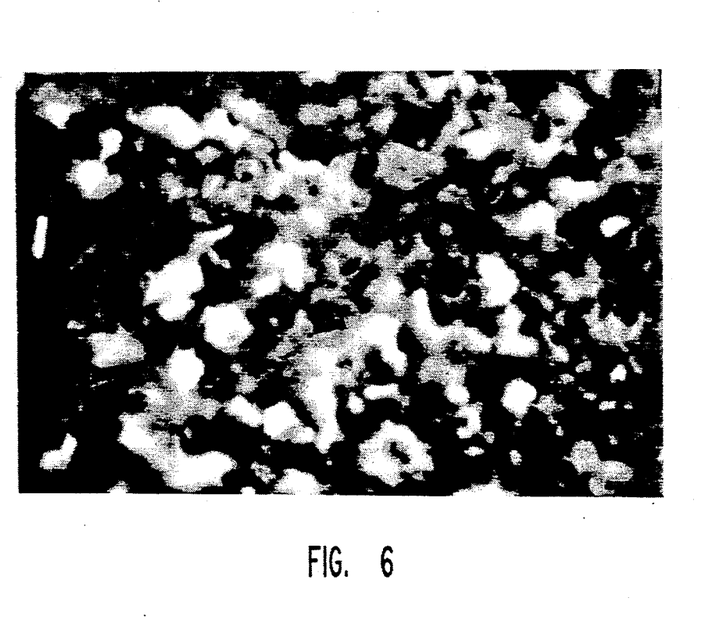
FIG. 6 depicts the same product as viewed at 10,000 times magnification with the same instrument.

FIGS. 5 and 6 are SEM photomicrographs of a polished section of this layer. The dark particles are diamond, the size of which can be determined by reference to the scale bars of the photographs. The diamond grain size is seen to conform to the grain size of the starting material, ranging up to about 0.5 micrometers. The white particles, which are somewhat overexposed in the photograph, are tungsten carbide. Cobalt is not clearly in evidence, its concentration being relatively low, but it is thought, because of relative wetting affinities, to be associated primarily with the WC particles. From FIG. 6, taken at 10,000 times magnification, it can be seen that the in situ-grown particles of WC tend to have a primarily elongated or rod-shaped habit. (Those particles appearing to have a blocky shape are primarily agglomerates of rod-shaped particles.) A typical particle has a length of 0.7 micrometers and a length-to-width ratio of 3. Without wishing to be bound by theory, it is thought that this predominately rod-shaped habit significantly increases the relative area of diamond/WC bonds to that which would be expected if the WC particles were substantially equi-axed. Additionally, the elongated WC particles may impart a type of fiber reinforcement to the composite.

To test the relative strength of the diamond/carbide composite, a simple drop test was devised whereby the dome of the insert simultaneously impacted the sides of two parallel, adjacent cylindrical targets. The composite compact was mounted, dome-side down, in a holder of 3.0 kg mass which was guided vertically via two linear ball bearings along parallel steel rods. The target cylinders, which consisted of sintered WC-11 wt% Co, were 16 mm in diameter, and were spaced 4 mm apart by being rigidly affixed to a 10 kg steel base. This resulted in the impact points on the surface of the dome being spaced 11 mm apart. The apparatus rested on a concrete floor. The compact being tested, together with its 3 kg holder, was dropped and allowed to bounce until it came to rest. The height of the drop was increased, (usually in four-inch increments) until cracks developed in the test part at both impact sites, as detected by testing with ultraviolet-light-fluorescent die penetrant. Because the targets were plastically deformed at the impact site, they were rotated between each successive drop to provide a fresh impact surface. The impact site on the test part was not changed until it had been dropped from a height sufficient to develop a crack at each impact site. (If both sites did not crack simultaneously, the average of the two crack-initiation heights was used.) This characteristic height was used as a figure of merit for comparing the impact resistance of different materials. After one such test was completed, the part could be rotated in the holder to provide a fresh pair of impact points, enabling the test to be duplicated. The impact figure of merit for the composite compact of this example was 30 inches.

A commercially-available three-layer dome-shaped insert of substantially the same dimensions was also tested. The outermost layer was prior-art PCD containing about 94 volume percent diamond; the inner two layers were of materials produced under U.S. Pat. No. 4,525,178. The substrate or base was of WC-6 wt% Co, like the composite produced in accordance with the invention. The outermost PCD layer of the prior-art compact exhibited equivalent resistance to SiC grit blast to the outermost composite layer of the compact produced in accordance with the invention. The impact figure of merit for the prior-art compact was 3 inches. It can thus be seen that the material of the invention exhibited an impact resistance of approximately ten times that of the aforementioned prior-art product.

A 6.5" diameter air-driven percussion bit was prepared utilizing sixteen inserts, eight being the invention of this example and eight prior-art inserts produced in accordance with U.S. Pat. No. 4,525,178. Blocks of Barre granite were drilled with the bit. The outer composite layer of the inserts of the invention had approximately 83 volume percent diamond, whereas the outer PCD layer of the prior-art inserts had approximately 94 volume percent diamond.

After 200 feet of drilling, the prior-art inserts showed extensive cracking of the outer PCD layer, with no change noticeable in the inserts of the invention. After 400 feet, the steel body had eroded to such an extent that all of the inserts had to be pressed out and pressed into a fresh bit. At this stage of the test, the prior-art inserts were extensively chipped, while the inserts of the invention showed only slight development of an orange-peel-like surface. The test was continued, with the inserts of the invention bearing an increasing share of the load as the prior-art inserts continued to chip away. The test was terminated at 900 feet, when extensive erosion of the steel bit body caused several inserts to fall out. The prior-art inserts were deeply chipped and pitted, and in several cases the base carbide was exposed. The compacts of the invention showed only a slight increase in the orange-peel-like surface.

EXAMPLE 2

A mixture suitable for preparing a transition layer was prepared from $WO_3$, basic cobalt carbonate, and diamond particles ranging up to about 0.5 micrometer in size in the following weight ratios: 15.6/68/16.4. The $WO_3$ and diamond were first milled together without the cobalt source in acetone, dried, and reduced with hydrogen at 1100° C. for 17 hours. In this step, 34% of the diamond was lost, (probably by methylation) which possibly improved the shape of the diamond for sintering. The tungsten metal/diamond mix was then milled together with the basic cobalt carbonate for an hour in acetone, dried, and reduced with hydrogen at 700° C. for 21 hours. Diamond loss at this stage was negligible. Total hydrogen consumption was 388 liters. Mass balance indicated the following compositions, by volume percent, of cobalt, tungsten metal, and diamond: 11.3, 41.8, and 46.9. After reaction-sintering to form tungsten carbide in situ, the compositions of the cobalt, tungsten carbide, and diamond, by volume percent, were calculated to be 11.5, 56.0, and 32.5. The reduced powder was protected from oxidation and lubricated by covering it with a solution of paraffin in petroleum naphtha, followed by evaporation of the naphtha.

Figure 3:
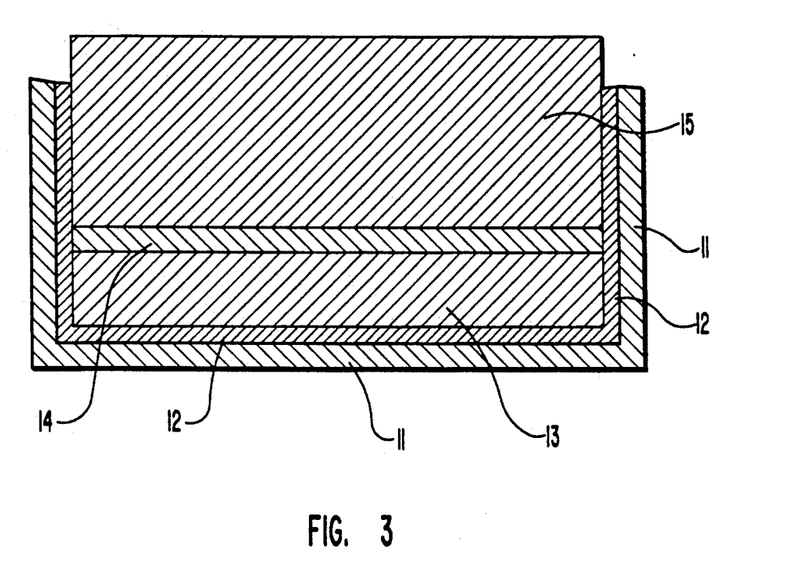
FIG. 3 depicts a charge assembly for producing the multilayered disk shown in FIG. 4.

Referring to FIG. 3, a two-layered can comprising outer layer 11 of Mo and inner layer 12 of Zr was formed in the shape of a flat-bottomed cylinder. An amount of cleaned, paraffincoated 100 micrometer diamond sufficient to provide a final layer thickness of 0.030" (0.76 mm) was spread in a uniform layer 13 in the bottom of the can, and pre-compacted in a die to approximately 300 MPa (45,000 psi). Sufficient weight of the prepared cobalt/tungsten metal/diamond mixture was spread in a uniform layer 14 onto the diamond layer to provide a final reaction-sintered thickness of 0.010".

This layer was also precompacted with the same applied pressure, using as the compaction punch a pre-sintered disk 15 of cemented WC-13 wt% Co, which was left in place to become the supporting substrate of a disk-shaped composite compact. Several such parts were prepared, and the paraffin was evaporated from the parts in vacuum. A high-pressure cell identical to that used for Example 1 was employed, except that three parts could be simultaneously accommodated inside a salt cylinder placed within the graphite heater assembly.

Figure 4:
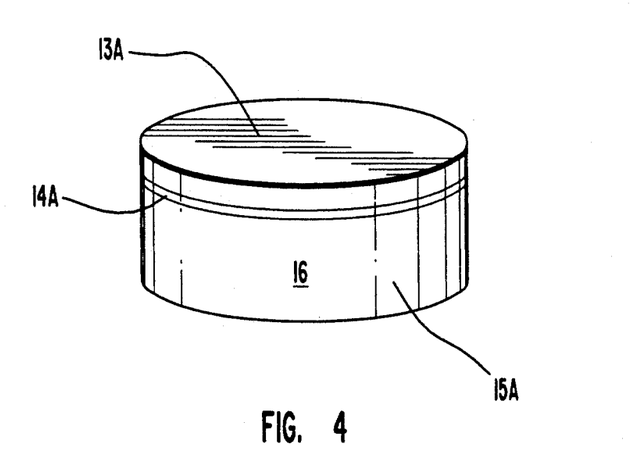
FIG. 4 shows a multilayered disk produced in accordance with the invention.

Compacts according to the invention were sintered at high pressure and temperature, utilizing the same conditions as in Example 1. During sintering, a liquid phase comprising Co, C, and W migrated from the transition layer 14 into diamond layer 13, thereby facilitating the sintering of the diamond layer. This liquid phase also facilitated the reaction sintering of transition layer 14, resulting in the formation of WC from W and diamond in situ. After recovery of the sintered assembly from the high-pressure cell, the Mo/Zr cans were grit-blasted away. The sintered diamond layer 13A exhibited excellent abrasion resistance, and transition layer 14A was seen to be well-sintered and firmly bonded to sintered diamond layer 13A and to the WC-Co support disk 15A. Microscopic examination of a polished cross-section of the part showed that transition layer 14A had been subdivided by in situ processes into two distinct layers, one of approximately 0.008" (0.20 mm) thickness; the other 0.002" (0.05 mm). The thinner layer was completely depleted of diamond to form a bonding layer similar to that of Example 1.

The sintered part was processed into a disk-shaped cutter 16 with a final diameter of 0.315" (8.0 mm), by diamond lapping of the flat sintered diamond surface, diamond grinding of the flat WC-Co surface, and diamond centerless-grinding of the cylindrical surface.

Prior art PCD compacts, having the same external dimensions as those of the invention, were prepared in identical fashion to those of the invention, except for the omission of transition layer 14. The prior-art product was therefore substantially that of U.S. Pat. No. 3,745,623. During sintering, the PCD layer of these prior-art compacts derived liquid catalyst/binder (principally Co) from the base carbide. The PCD layer of the prior art product utilized a different source of catalyst/binder than the sintered diamond layer 13A of the invention, which utilized a liquid phase derived from transition layer 14, and that therefore the outer diamond layers of the two products would not necessarily be expected to have identical compositions.

The relative attachment strength of the diamond layer to the base carbide was then tested by an independent laboratory equipped with a special apparatus designed for this purpose. (Delamination of the PCD layer from the base carbide is a frequent mode of failure for prior-art disk-shaped inserts utilized as cutting elements in shear-type oil and gas drill bits, due to the high impact forces frequently and unpredictably encountered.) In essence, the disk-shaped composite insert was placed in a matching cylindrical well in a steel holder, leaving only the diamond layer exposed. The diamond layer was then loaded from the side with a transverse shear force by means of a thin steel pusher which conformed to the cylindrical perimeter of the diamond layer until the diamond layer delaminated from the base carbide. In order to permit comparison of different materials, parts having identical external dimensions and similar diamond-layer thicknesses were tested. Layers 13A and 14A of the invention exhibited, on average, 1.9 times the shear strength of the prior-art PCD layer, thereby demonstrating the utility of the present invention for high impact applications, such as in oil and gas shear bits.

EXAMPLE 3

Three composite mixes were prepared from basic cobalt carbonate, tungstic oxide, and diamond particles ranging up to about 0.5 micrometers in size in the weight ratios (1) 23.6/25.5/50.9, (2) 13.4/64.5/22.1, and (3) 9.5/79.1/11.4, respectively. The basic cobalt carbonate was first milled alone with acetone in carbide mills for 30 minutes, the tungstic oxide was then added and the mixture was milled for an additional 90 minutes, and finally the diamond particles were added and the mixture milled for an additional 60 minutes. The milled mixtures were dried, spread in a layer about 10 mm thick in quartz boats, and reduced with hydrogen at 600° C. for 16 hours. At this point mix (1), having the highest diamond concentration, was completely reduced, mix (2), of intermediate diamond concentration, was 88% reduced, and mix (3), of lowest diamond concentration, was 86% reduced. All three mixes were then separately re-milled in the same carbide mills with acetone for three additional hours, and then reduced in hydrogen at 700° C. for an additional 34 hours. Total hydrogen consumption was 3270 liters, with 2.4% of the hydrogen actually being consumed by the reduction reaction. Final concentrations of cobalt, tungsten metal, and diamond in mixes (1), (2), (3), in volume percent, corrected for diamond loss by mass balance, were (1) 8.8/6.4/84.8, (2) 8.4/27.5/64.1, and (3) 8.5/48.1/43.4, respectively.

Accounting for the diamond consumed by reaction with tungsten to form tungsten carbide and assuming no migration of cobalt into or out of any layer, the final volume concentrations of the reaction-sintered layers (i.e., cobalt metal, tungsten carbide formed in situ, and diamond) were calculated to be: (1) 8.8/8.5/82.7, (2) 8.5/36.5/55.0, and (3) 8.6/64.2/27.2.

The powders were further processed into three-layer dome inserts according to the steps of example 1, with the exception that two different grades of a cemented carbide base were employed. The first cemented carbide base was identical to that used in example 1, that is, with 6 wt% cobalt. The second cemented carbide base had 14.5 wt% cobalt. To all external appearances, the parts were identical, and the outermost layer, having 82.7 volume percent diamond, exhibited no discernable erosion by SiC grit blast in either case. The parts with the 6 wt% cobalt base gave a 27-inch average drop test. The parts having a 14.5 wt% cobalt base gave a 10-inch average drop test. Because the 14.5 wt% cobalt cemented carbide has a higher coefficient of thermal expansion than the 6 wt% cobalt base, such parts are expected to have greater built-in stress following cooling down from the elevated sintering temperature. Perhaps more important, the 14.5 wt% cobalt cemented carbide has a lower modulus of elasticity, thereby inducing greater deflection under load, which induces higher stresses under impact in the relatively thin diamond/carbide layers.

Despite these higher stresses, the diamond/carbide composite material of the invention bonded to the 14.5 wt% cobalt cemented carbide still exhibited more than three times the impact resistance of the commercially available prior-art material bonded to the 6 wt% cobalt cemented carbide (as disclosed in U.S. Pat. No. 4,525,178), with the added advantage that the 14.5 wt% cobalt cemented carbide material can be expected to be much less prone to breakage in the field.

EXAMPLE 4

This example relates to the production of a shear cutter disk measuring about 19 mm in diameter. FIGS. 3 and 4 apply to this example, as well as to Example 2, but with different dimensions.

The disk 16 as finally produced is depicted in FIG. 4 and comprises a top sintered diamond layer 13A about 0.9 mm thick containing about 95 vol. % diamond particles ranging from 22 to 36 micrometers, a transition layer 14A about 0.25 mm thick estimated to contain by volume 36% diamond, 20% Co and 44% WC, the WC being produced in situ by reaction with a carbon source comprised substantially of diamond particles, and a bottom substrate disk 15A of a cemented tungsten carbide/cobalt disk containing by weight about 87% WC and 13% Co.

In producing the two-layered disk assembly, the material for transition layer 14A was produced by milling 64.5 g of cobalt hydroxide for 60 minutes with tungsten carbide balls in a tungsten carbide vibratory mill in acetone. 177.8 g of tungstic oxide was then added, and the milling was continued for four hours. 37.1 g of diamond particles ranging in size from about 5 to about 10 micrometers were then added the mixture of all three components ws milled for an additional 30 minutes. The mixture was divided between six quartz boats, spread in layers approximately 10 mm thick, and was reduced with hydrogen at about 700° C. for 19 hours to provide a composition containing by volume about 47% diamond, about 33% tungsten and about 20% cobalt. 1100 liters of hydrogen were utilized, of which about 7% reacted with oxides present in the mixture.

A zirconium/molybdenum can assembly for producing the composite compact as described herein was prepared having an internal diameter of about 19 mm. The flat-bottomed can is illustrated in FIG. 3 and comprises an outer shell of molybdenum (Mo) and an inner wall of zirconium (Zr).

Prior to forming the layers in the can, the transition layer powder was mixed with about 38% by volume (about 5% by weight) of mineral oil to protect the powder from oxidation and to serve as a binder during pre-compaction of the compact.

A mixture of clean diamond particles ranging in size from about 22 to about 36 micrometers was mixed with mineral oil to provide about 25% by volume (about 8% by weight) oil. The diamond/mineral oil mix was placed as layer 13 in the bottom of the can as depicted in FIG. 3 and pressed by means of a conforming WC/Co plunger at a pressure of about 120 MPa (18,000 psi).

The transition layer mixture of W, Co and diamond was similarly spread in the container on top of the diamond layer and pressed using the 87 wt% WC/13 wt% Co support disk 15 at approximately the same pressure. Support disk 15 was left in place.

The mineral oil was thereafter evaporated and the assembly was again pre-compacted at about the same pressure. Two such assemblies Were placed back to back, such that diamond layer 13 of each part faced outward. The parts were surrounded within the cylindrical graphite heater assembly of the cubic press by fully-dense conforming pieces of salt. The parts were reaction-sintered at high pressure and high temperature using the same conditions and time cycle as Example 1. As was the case in Example 2, a liquid phase derived from transition layer 14 infiltrated the diamond layer 13 to facilitate sintering. This Co/W/C liquid phase also facilitated the in situ growth of WC particles and the consolidation and sintering of transition layer 14.

Following reaction sintering of transition layer 14 and the sintering of diamond layer 13 of the assembly, the power was shut off and the sintered product assembly was cooled and removed from the press.

Examination of the product following grit blasting with SiC grit showed that the layers were strongly bonded together by virtue of the transition layer 14A which comprised by volume about 36% diamond, about 44% WC and 20% Co. The transition layer was strongly bonded to the cemented carbide substrate and to the sintered diamond layer. The diamond layer 13A exhibited excellent resistance to the SiC grit blast.

A disk-shaped composite cutter 16 was prepared by lapping and grinding. The cutter was rigidly mounted in a steel fixture at an angle of about 20° from the horizontal, and a hardened steel hammer was dropped so as to impact the cutting edge of the compact. The compact of the invention was found to exhibit superior resistance to chipping and spalling relative to commercially available prior art PCD compacts prepared according to U.S. Pat. No. 3,745,623. It is believed that the transition layer 14A of the compact prepared according to the invention reduced the residual stress in the sintered diamond layer 13A, and enhanced the bonding of said diamond layer to the WC/Co substrate 15A.

These examples demonstrate the utility of the invention in achieving the stated objectives.

In summary, in carrying out the method, the carbon source material relative to the refractory metal is provided in an amount equal to or exceeding the maximum reactive capacity of the refractory metal (e.g. the stoichimetric capacity with carbon) at the temperature and pressure at which diamond is stable. Any unreacted carbon remaining after the sintering is present substantially as diamond, the amount of diamond ranging from 0% to about 95% by volume, substantially the balance comprising in situ formed refractory metal carbide and the binder metal.

In another embodiment, the carbon source may be provided in an amount less than the maximum reactive capacity of the refractory metal with said carbon at the temperature and pressure of the reaction but not less than 25% of said capacity, said carbon source being substantially consumed by reaction with the refractory metal.

In a preferred embodiment, the sintered product is characterized by a substantially uniform distribution of diamond particles, of in situ produced rod-shaped carbide particles of tungsten carbide and cobalt binder metal, with the diamond particles ranging in amount from about 95% to about 1% by volume, the tungsten carbide particles ranging in amount from about 1% to about 99% by volume, the sum of said diamond and said tungsten carbide being at least about 70% by volume and not more than about 99% by volume, with cobalt substantially the balance.

Where the hydrogen reduction of the mixture of refractory metal compound and the carbon source results in a partial carburization of particles of said reduced refractory metal, the partial carburization preferably should not exceed about 75% of the maximum carbon capacity of said refractory metal at the sintering temperature and pressure.

In an additional embodiment of the invention, a sintered composite structure is produced by providing a plurality of layers of compacted mixtures of particles of refractory metal and particles of a carbon source material. The compacted layers are disposed one upon the other ranging from a first layer to an Nth layer, with the first layer disposed upon a supporting substrate. Each of the layers differs from the other in relative composition, such that the amount of diamond present in each of said layers after sintering increased progressively from less than about 40% by volume in said first layer to greater than about 70% by volume in the Nth layer, substantially the balance in each layer comprising said in situ produced refractory metal carbide and said binder metal.

In forming the aforementioned sintered composite structure, tungsten is the preferred refractory metal and diamond the preferred source of carbon. The diamond is provided in the first layer in an amount equal to or exceeding the maxiumum refractory capacity of the tungsten metal (for example, the stoichiometric maximum) in the first layer, the amount of diamond in each succeeding layer being provided in an amount exceeding the maximum reactive capacity of the refractory metal in the first layer at the sintering conditions of temperature and pressure at which diamond is stable, the in situ produced refractory metal carbide in each of the sintered layers being tungsten carbide substantially in the form of rod-shaped particles.

Another embodiment of a composite structure is one which is produced by providing a supporting substrate, for example, a cobalt-bonded tungsten carbide structure supporting a first group of layers and a second group of layers, each group comprising at least one layer, the layer in the first group comprising a compact containing a carbide-forming refractory metal and a carbon source. Each layer in the second group comprising diamond, such that following sintering of the composite layers, each said layer is coherently bonded to its adjacent layer, with the first layer of the first group coherently bonded to the supporting substrate. The amount of diamond present after the sintering is less than 40% by volume in the first layer of the first group and is greater than about 70% by volume in the last layer of the last group.

The supporting substrate of cemented WC/Co generally contains about 7% to 27% by volume of cobalt.

With respect to the foregoing method, the refractory metal in each of the layers in the first group is preferably tungsten, with each of said layers in the second group consisting essentially of diamond particles, each layer in the first group of sintered layers containing in situ produced tungsten carbide, and each layer in the second group of sintered layers consisting essentially of polycrystalline diamond.

The second group of layers may comprise at least two layers of diamond particles, comprising a first layer and a last layer, the average size of diamond particles in the first layer ranging from about 150 to about 30 micrometers in size, with the average grain size of the diamond particles in the last layer ranging from about 30 to about 10 micrometers in size, the average size in the first layer being greater than about twice the average size in the last layer.

A particular composite article of manufacture is one in which the supporting substrate is a cemented tungsten carbide/cobalt composition in which the amount of cobalt therein ranges from about 7% to about 27% by volume, and the balance essentially tungsten carbide, the substrate supporting first, second and third layers. The amount of cobalt in the third layer does not exceed the amount of cobalt in the second layer, the amount of cobalt in the second layer not exceeding the amount of cobalt in the first layer, the amount of cobalt in the substrate. The amount of diamond ranges by volume from 0% to about 35% in the first layer, from about 35% to about 70% layer in the second layer, and from about 70% to about 96% in the third layer, with the in situ formed tungsten carbide and the cobalt forming essentially the balance in each of said layers.

The substrate of the composite article of manufacture may take on various shapes. Thus, the substrate may have a form of a substantially cylindrical gripping surface and a distal working surface, the working surface having a shape suited to a particular application. The working surface may comprise a plane, a section of a sphere, a cone, a parabloid, a wedge, a chisel, or the like, with the sintered layers being disposed upon and bonded to the working surface using the sintering process of the invention. Each of the sintered layers is characterized by a maximum thickness, the first layer being about 0.1 to about 0.5 mm in maximum thickness, the second layer being about 0.1 to about 0.5 mm in maximum thickness and the third layer being about 0.1 to about 1.5 mm in maximum thickness.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of forming a sintered product which comprises:
   providing a substantially uniform mixture comprising a hydrogen-reducible compound of a carbide-forming refractory metal and a carbon source material comprised substantially of diamond,
   subjecting said mixture to hydrogen reduction at an elevated temperature conducive to the reduction of said compound, thereby producing a reduced mixture comprising particles of reduced refractory metal and particles of said diamond,
   forming a dense compact of said reduced mixture,
   subjecting said compact to sintering in the presence of an iron-group binder metal at a temperature at which a liquid phase forms comprising said iron-group binder metal, said carbide-forming refractory metal, and carbon, and at a pressure at which diamond is stable,
   continuing said sintering to form by reaction refractory metal carbide in situ,
   said liquid phase being distributed through said compact during said sintering,
   and cooling said compact to provide a sintered product comprising particles of said in situ produced refractory metal carbide and said binder metal.

2. The method of claim 1, wherein said carbon source material is provided in an amount equal to or exceeding the maximum reactive capacity of said refractory metal with carbon at said conditions of temperature and pressure, any unreacted carbon remaining after said sintering being present substantially as diamond, said diamond ranging in amount from about 0% to about 95% by volume, the balance comprising said refractory metal carbide and said binder metal.

3. The method of claim 1, wherein said carbon source material is provided in an amount less than the maximum reactive capacity of said refractory metal with carbon at said conditions of temperature and pressure but not less than about 25% of said capacity, said carbon source being substantially consumed by reaction with said refractory metal.

4. The method of claim 1, wherein said refractory metal compound comprises an oxygen-containing compound selected from the group Nb, Ta, Cr, Mo, W, and mixtures thereof and wherein said binder metal is at least one of Fe, Co, and Ni.

5. The method of claim 4, wherein said refractory metal compound is selected from the group of oxides of tungsten, ammonium tungstates, oxides of molybdenum, ammonium molybdates, and mixtures thereof.

6. The method of claim 5, wherein said refractory metal compound is selected from the group of oxides of tungsten and ammonium tungstates, said binder metal is cobalt, and said in situ produced refractory metal carbide is tungsten carbide substantially in the form of rod-shaped particles.

7. The method of claim 6, wherein said sintered product is characterized by a substantially uniform distribution of diamond particles, of in-situ produced rod-shaped carbide particles of tungsten carbide, and of said cobalt binder metal, said diamond particles ranging in amount from about 95% to about 1% by volume, said tungsten carbide particles ranging in amount from about 1% to about 99% by volume, at least about 70% and not more than about 99% by volume, said cobalt comprising the balance.

8. The method of claim 1, wherein said hydrogen reduction of said mixture of refractory metal compound and carbon source results in partial carburization of said particles of reduced refractory metal prior to forming of said compact, the extent of said partial carburization not exceeding about 75% of the maximum carbon capacity of said refractory metal at said conditions of temperature and pressure.

9. The method of claim 1, wherein the presence of said iron group binder metal is achieved prior to forming said compact by mixing particles of said binder metal or particles of a hydrogen-reducible compound of said binder metal with said mixture of refractory metal compound and carbon source material prior to said hydrogen reduction, said reduction thereby producing a reduced mixture comprising particles of said reduced refractory metal, particles of said diamond, and particles of said iron group binder metal.

10. The method of claim 9, wherein said iron group metal compound is selected from the group consisting of hydrous and anhydrous forms of cobalt hydroxide, cobalt carbonate, basic cobalt carbonate, and mixtures thereof.

11. The method of claim 1, wherein said iron group binder metal comprises a mass containing said binder metal placed adjacent to said compact formed of carbide-forming refractory metal and carbon source material from which mass said iron group binder metal in a liquid phase is caused to infiltrate said compact during sintering.

12. The method of claim 11, wherein said mass containing said binder metal consists of a supporting substrate of cobaltcemented tungsten-carbide.

13. A method of forming a sintered product which comprises:

providing a compact formed of a substantially uniform mixture of particles of tungsten metal and a carbon source material selected from the group of diamond, non-diamond carbon, and mixtures thereof, subjecting said compact to sintering in the presence of cobalt metal at a temperature at which a liquid phase forms comprising said cobalt, said tungsten, and carbon, and at a pressure at which diamond is stable, continuing said sintering to form by reaction tungsten carbide in situ, and cooling said compact to provide a sintered product comprising said cobalt and said in situ produced tungsten carbide, wherein said carbon source material is provided in an amount substantially equal to or in excess of the maximum reactive capacity of said tungsten metal with carbon at said conditions of temperature and pressure, any free carbon remaining after said sintering being present substantially as diamond, said diamond ranging in amount from about 0% to about 95% by volume, the balance comprising said tungsten carbide and said cobalt.

14. The method of claim 13, wherein said carbon source material is diamond and said in situ produced refractory metal carbide is tungsten carbide substantially in the form of rod-shaped particles.

15. The method of claim 14, wherein said sintered product is characterized by a substantially uniform distribution comprising diamond particles, said in-situ produced rod-shaped carbide particles of tungsten carbide, and said cobalt binder metal, said diamond particles ranging in amount from about 95% to about 1% by volume, said tungsten carbide particles ranging in amount from about 1% to about 99% by volume, the sum of said diamond and said tungsten carbide totalling at least about 70% and not more than about 99% by volume, said cobalt comprising the balance.

16. The method of claim 13, wherein said particles of tungsten metal are partially carburized prior to forming said compact, the extent of said partial carburization not exceeding about 75% of the maximum carbon capacity of said tungsten at said conditions of temperature and pressure.

17. The method of claim 13, wherein the presence of said cobalt metal is provided by mixing particles of said cobalt with said tungsten metal and said carbon source material prior to forming said compact.

18. The method of claim 13, wherein said cobalt metal comprises a mass containing said cobalt disposed adjacent to said compact formed of tungsten and carbon source material from which mass said cobalt in a liquid phase is caused to infiltrate said compact during sintering.

19. The method of claim 18, wherein said mass containing said cobalt consists essentially of a supporting substrate of cobalt-cemented tungsten-carbide.

20. A method of forming a sintered product which comprises:

providing a substantially uniform mixture of a compound selected from the group consisting of tungsten trioxide and ammonium paratungstate,
a carbon source material comprised substantially of diamond,
and a compound selected from the group consisting of cobalt hydroxide and hydrated basic cobalt carbonate,
subjecting said mixture to hydrogen reduction, thereby producing a reduced mixture comprising particles of reduced tungsten metal, diamond, and reduced cobalt metal,
forming a dense compact of said reduced mixture,
subjecting said compact to sintering at a temperature at which a liquid phase forms comprising said cobalt, said tungsten, and carbon, and at a pressure at which diamond is stable,
continuing said sintering to form by reaction tungsten carbide in situ,
and cooling said compact to provide a sintered product comprising particles of said tungsten carbide and said cobalt,
wherein said carbon source material is provided in an amount substantially equal to or in excess of the maximum reactive capacity of said reduced tungsten metal with carbon at said conditions of temperature and pressure, any free carbon remaining after said sintering being present substantially as diamond, said diamond ranging in amount from about 0% to about 95% by volume, the balance comprising said tungsten carbide and said cobalt.

21. The method of claim 20, wherein said in situ produced tungsten carbide is substantially in the form of rod-shaped particles.

22. The method of claim 21, wherein said sintered product is characterized by a substantially uniform distribution of diamond particles, of said in-situ produced rod-shaped carbide particles of tungsten carbide, and of said cobalt binder metal,
said diamond particles ranging in amount from about 95% to about 1% by volume, said tungsten carbide particles ranging in amount from about 1% to about 99% by volume, the sum of said diamond and said tungsten carbide totalling
at least about 70% and not more than about 99% by volume, said cobalt comprising the balance.

23. The method of claim 20, wherein said hydrogen reduction of said mixture of tungsten metal compound and carbon source results in partial carburization of said particles of reduced tungsten metal prior to forming of said compact, the extent of said partial carburization not exceeding about 75% of the maximum carbon capacity of said tungsten metal at said conditions of temperature and pressure.

24. The method of claim 20, wherein a supporting substrate of cobalt-cemented tungsten-carbide is provided adjacent to said compact, said substrate providing an auxiliary source of liquid during said sintering.

25. The method of claim 1, or claim 13, or claim 20, wherein a sintered composite structure is produced by providing a plurality of at least two layers of compacted mixtures comprising said refractory metal and said carbon source material,
said compacted layers ranging from a first layer to an Nth layer, said first layer being disposed upon a supporting substrate,
each of said layers differing from every other layer in relative composition of said carbon source material and said refractory metal,
such that the amount of diamond present in each of said layers after said sintering increases progressively from less than about 40% by volume in said first layer to greater than about 70% by volume in said Nth layer, the balance in each layer comprising said refractory metal carbide and said binder metal.

26. The method of claim 1, or claim 13, or claim 20, wherein a sintered composite structure is produced by providing a supporting substrate, a first group of layers and a second group of layers, each group comprising at least one layer,
each layer in said first group consisting of a compact comprising said carbide-forming refractory metal and said carbon source material, each layer in said second group comprising diamond,
said sintering process resulting in each of said layers being coherently bonded to each adjacent layer, the first layer of said first group being coherently bonded to said supporting substrate,
wherein the amount of diamond present after said sintering is less than about 40% by volume in the first layer of said first group and is greater than about 70% by volume in the last layer of said last group.

* * * * *